United States Patent
Rodriguez Bravo et al.

(10) Patent No.: US 11,601,389 B1
(45) Date of Patent: Mar. 7, 2023

(54) EMAIL SYSTEM WITH ACTION REQUIRED AND FOLLOW-UP FEATURES

(71) Applicant: Kyndryl, Inc., New York, NY (US)

(72) Inventors: Cesar Augusto Rodriguez Bravo, Alajuela (CR); Desilda Toska, Alajuela (CR)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/571,692

(22) Filed: Jan. 10, 2022

(51) Int. Cl.
*H04L 51/18* (2022.01)

(52) U.S. Cl.
CPC .................... *H04L 51/18* (2013.01)

(58) Field of Classification Search
CPC ...................................... H04L 51/18
See application file for complete search history.

(56) References Cited

U.S. PATENT DOCUMENTS

| | | | |
|---|---|---|---|
| 8,250,155 B2 * | 8/2012 | Corry | G06Q 10/107 709/206 |
| 2007/0136430 A1 * | 6/2007 | Qureshi | H04L 51/23 709/206 |
| 2015/0143258 A1 | 5/2015 | Carolan et al. | |
| 2016/0224939 A1 | 8/2016 | Chen et al. | |
| 2016/0335572 A1 | 11/2016 | Bennett et al. | |
| 2016/0344678 A1 * | 11/2016 | MacDonald | G06Q 10/103 |
| 2018/0039926 A1 | 2/2018 | Karlson | |
| 2019/0244156 A1 * | 8/2019 | Hauser | G06Q 10/06312 |

FOREIGN PATENT DOCUMENTS

CA    2302250    3/1999

OTHER PUBLICATIONS

Mell et al., "The NIST Definition of Cloud Computing", NIST, Special Publication 800-145, Sep. 2011, 7 pages.
Allan, "Top Gmail Tools: Automatic Follow-ups & Reminders for Sales Campaigns", https://vocus.io/blog/top-followup-scheduling-gmail/, Dec. 3, 2019, 16 pages.
Chumakova, "Tired of tracking multiple follow-ups in email? Track progress of delegated tasks automatically!", https://www.comindware.com/blog-tired-tracking-multiple-follow-ups-email-track-progress-delegated-tasks-automatically/, Dec. 17, 2013, 4 pages.
(Continued)

*Primary Examiner* — Joe Chacko
(74) *Attorney, Agent, or Firm* — Erik Swanson; Andrew M. Calderon; Calderon Safran & Cole P.C.

(57) ABSTRACT

A computer-implemented method includes: receiving, by a computing device, input from a sender of an email, the input defining the email as having a task associated with it; inserting, by the computing device, code into the email, the code defining a selectable object in the email; sending, by the computing device, the email to one or more recipients; receiving, by the computing device, input indicating a selection of the selectable object by one of the one or more recipients; assigning, by the computing device, the one of the one or more recipients as an owner of the task; and sending, by the computing device, a notification email to the sender and the one or more recipients, the notification email indicating the owner of the task.

20 Claims, 8 Drawing Sheets

(56) References Cited

OTHER PUBLICATIONS

Anonymous, "Email Client Market Share, Market Size and Industry Growth Drivers, 2019-2023", https://www.t4.ai/industry/email-client-market-share, Jan. 23, 2021, 5 pages.

Anonymous, "IBM Verse On-Premises V1.0.3 brings calendar and mail delegation capabilities, and improved performance", https://www.ibm.com/common/ssi/rep_ca/1/897/ENUS217-571/ENUS217-571.PDF, IBM United States Software Announcement 217-571, Dec. 19, 2017, 9 pages.

Davidov, "Use Your Own Provider for Mail Sent with IBM Cloud App ID", https://www.ibm.com/cloud/blog/use-ibm-cloud-app-id-and-your-email-provider-to-brand-mails-sent-to-app-users, Oct. 22, 2018, 12 pages.

Anonymous, "Email Delivery, powered by Sendgrid", https://cloud.ibm.com/catalog/infrastructure/email-delivery, accessed Jan. 6, 2022, 2 pages.

Anonymous "The easiest email reminder tool", https://remindly-dcb1f.web.app/?utm_source=google&utm_medium=cpc&utm_campaign=landing_page_initiale&utm_content=follow-up&gclid=CjwKCAiAg8OBBhA8EiwAIKw3kqa-XACB69AOR-3bAxURQEIQJ_suqeKc5NyAUR2n7tqHE6vlYy-5xoCryYQAvD_BwE, accessed Jan. 6, 2022, 6 pages.

\* cited by examiner

| | 800 |
|---|---|
| From | Recipient1@recipient1.com |
| Sent | January 1, 2022 |
| To | Sender@sender.com, Recipient2@recipient2.com, Recipient3@recipient3.com |
| Subject | RE: Search results ready |

805 → Recipient1 agreed to handle this task.

530 →
> Hello All,
> Please review and respond to the attached search results.
>
> Regards,
> Sender

FIG. 8

| | 900 |
|---|---|
| From | Sender@sender.com |
| Sent | January 2, 2022 |
| To | Recipient1@recipient1.com, Sender@sender.com |
| Subject | RE: Search results ready |

905 → Hello Recipient1,

This is a reminder to complete the task noted below.

805 →
> Recipient1 agreed to handle this task.
>
>

530 →
> > Hello All,
> > Please review and respond to the attached search results.
> >
> > Regards,
> > Sender

FIG. 9

EMAIL SYSTEM WITH ACTION REQUIRED AND FOLLOW-UP FEATURES

BACKGROUND

Aspects of the present invention relate generally to email systems and, more particularly, to email systems having action required and follow-up features.

Email is an important method of business communication that is fast, inexpensive, accessible, and easily replicated. Using email can greatly benefit businesses because it provides efficient and effective ways to transmit many kinds of electronic data. One of the main advantages of email is that a user can quickly and easily send electronic files such as text documents, photos, and data sheets to several contacts simultaneously by attaching a file to an email.

SUMMARY

In a first aspect of the invention, there is a computer-implemented method including: receiving, by a computing device, input from a sender of an email, the input defining the email as having a task associated with it; inserting, by the computing device, code into the email, the code defining a selectable object in the email; sending, by the computing device, the email to one or more recipients; receiving, by the computing device, input indicating a selection of the selectable object by one of the one or more recipients; assigning, by the computing device, the one of the one or more recipients as an owner of the task; and sending, by the computing device, a notification email to the sender and the one or more recipients, the notification email indicating the owner of the task.

In another aspect of the invention, there is a computer program product including one or more computer readable storage media having program instructions collectively stored on the one or more computer readable storage media. The program instructions are executable to: receive input from a sender of an email, the input defining the email as having a task associated with it; insert code into the email, the code defining a selectable object in the email; send the email to one or more recipients; receive input indicating a selection of the selectable object by one of the one or more recipients; assign the one of the one or more recipients as an owner of the task; and send a notification email to the sender and the one or more recipients, the notification email indicating the owner of the task.

In another aspect of the invention, there is system including a processor, a computer readable memory, one or more computer readable storage media, and program instructions collectively stored on the one or more computer readable storage media. The program instructions are executable to: receive input from a sender of an email, the input defining the email as having a task associated with it; insert code into the email, the code defining a selectable object in the email; send the email to one or more recipients; receive input indicating a selection of the selectable object by one of the one or more recipients; assign the one of the one or more recipients as an owner of the task; and send a notification email to the sender and the one or more recipients, the notification email indicating the owner of the task.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIGS. 5-11 show examples of user interfaces displayed on user devices in accordance with aspects of the invention

DETAILED DESCRIPTION

Figure 1:
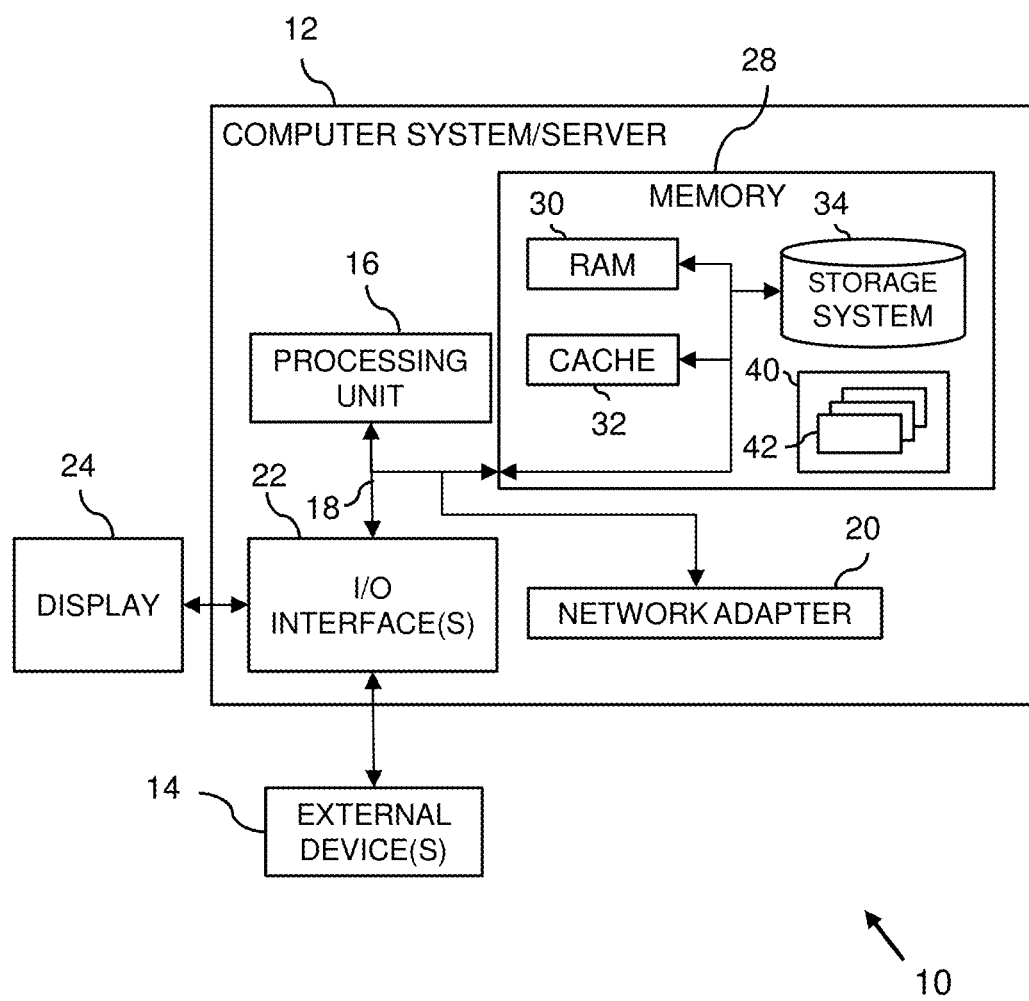
FIG. 1 depicts a cloud computing node according to an embodiment of the present invention.

Aspects of the present invention relate generally to email systems and, more particularly, to email systems having action required and follow-up features. Because email has become ubiquitous in daily work and life, many users find themselves overwhelmed with keeping track of the many emails they have sent and received. As a result, following up on all emails becomes nearly impossible and the user can lose information in this situation. Aspects of the invention address this problem by providing an email system that permits an email recipient to assume ownership of an email-related task, where the system tracks completion of the email-related task and provides follow-ups to both the sender and the recipient when the email-related task has not been completed in a predefined amount of time. In embodiments, the system receives a sender input that defines an email as including an email-related task. In embodiments, in response to this input by the sender, the system injects code into the email that is sent to one or more recipients, the code defining a selectable object in the email that is received by the one or more recipients. In embodiments, in response to receiving input from one of the recipients selecting the selectable object in the email, the system defines that recipient as an owner of the email-related task and monitors the email for completion of the email-related task. In embodiments, in response to determining the owner has not completed the email-related task within a predefined amount of time, the system automatically sends a follow-up to both the sender and the owner to remind the owner, the follow-up indicating that the email-related task is awaiting completion. In this manner, implementations of the invention provide for automated following up of email-related tasks.

According to an aspect of the invention, there is a computer-implemented process for managing tasks, the computer-implemented method including: in response to sending an email including an associated task to complete, receiving from a recipient of the email an indication of acceptance of responsibility to complete a required action for the associated task; in response to a determination the email is a type requiring a response, initiating follow up tracking for the associated task; in response to a determination a required action for the associated task was not taken within a predetermined time, sending a notification to the recipient to complete the required action; in response to a determination the required action was taken within the predetermined time, closing the task; and terminating the follow up tracking for the associated task.

Implementations of the invention provide an improvement in the technical field of email systems by providing a practical application of automatically monitoring an email for completion of an email-related task for which a user has assumed ownership, and automatically sending a follow-up to both the sender and the owner when the owner has not completed the task within a predefined amount of time. Implementations of the invention also change the state of an email by adding a selectable object to the email that does not otherwise exist, and only add the object in response to receiving input from the sender of the email.

It should be understood that, to the extent implementations of the invention collect, store, or employ personal information provided by, or obtained from, individuals (for example, emails and related information), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
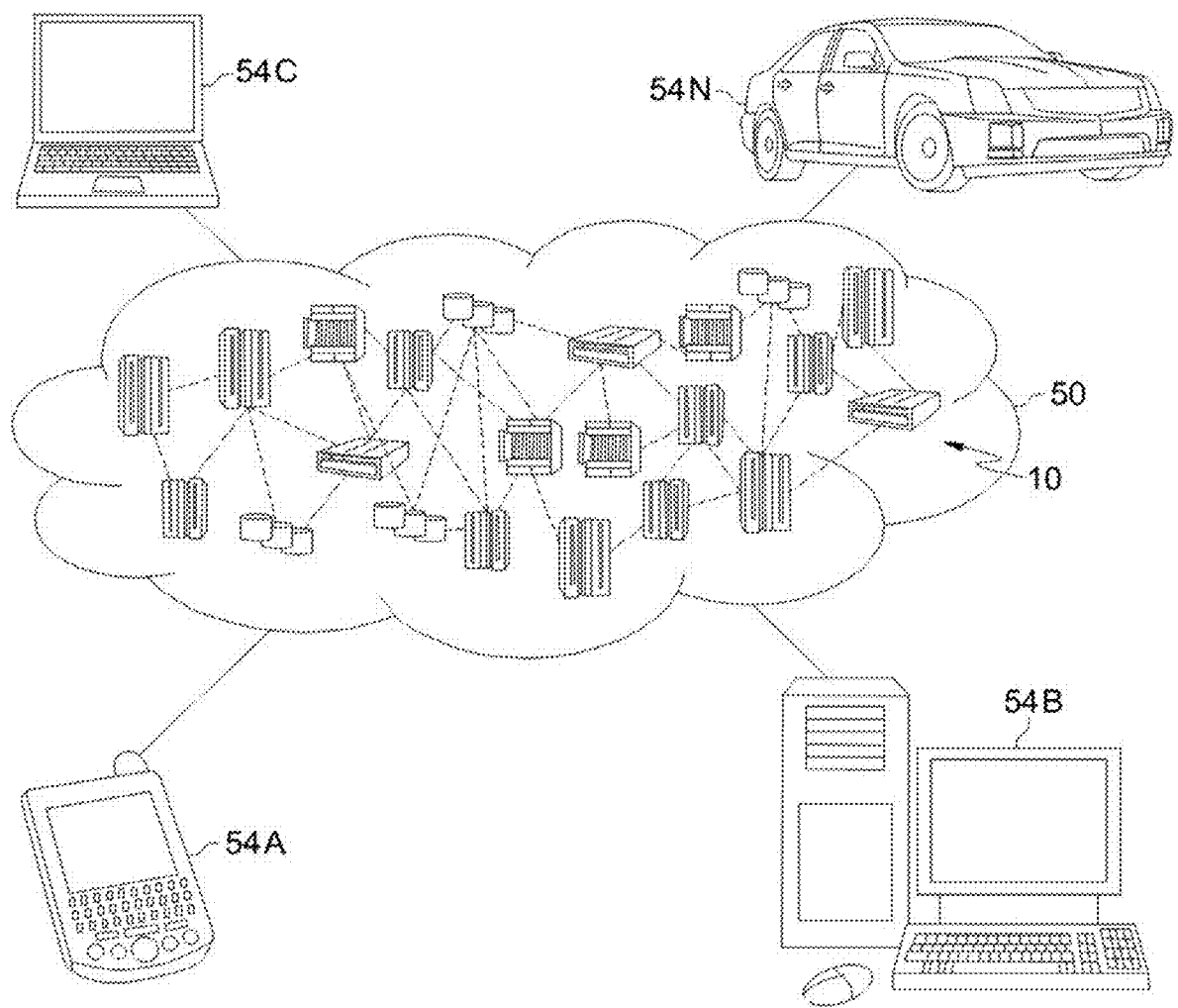
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
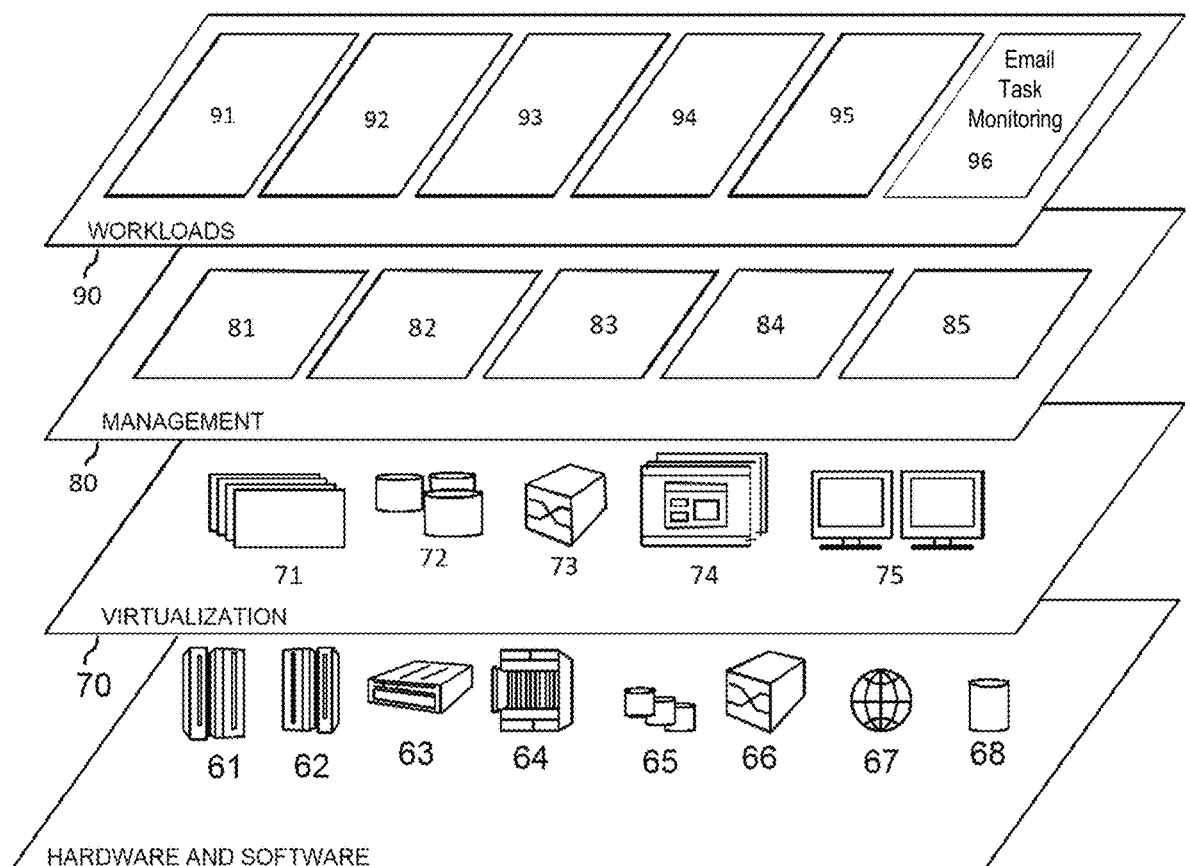
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and email task monitoring 96.

Implementations of the invention may include a computer system/server 12 of FIG. 1 in which one or more of the program modules 42 are configured to perform (or cause the computer system/server 12 to perform) one or more functions of the email task monitoring 96 of FIG. 3. For example, the one or more of the program modules 42 may be configured to: receive input from a sender of an email, the input defining the email as having a task associated with it; insert code into the email, the code defining a selectable object in the email; send the email to one or more recipients; receive input indicating a selection of the selectable object by one of the one or more recipients; assign the one of the one or more recipients as an owner of the task; and send a notification email to the sender and the one or more recipients, the notification email indicating the owner of the task.

Figure 4:
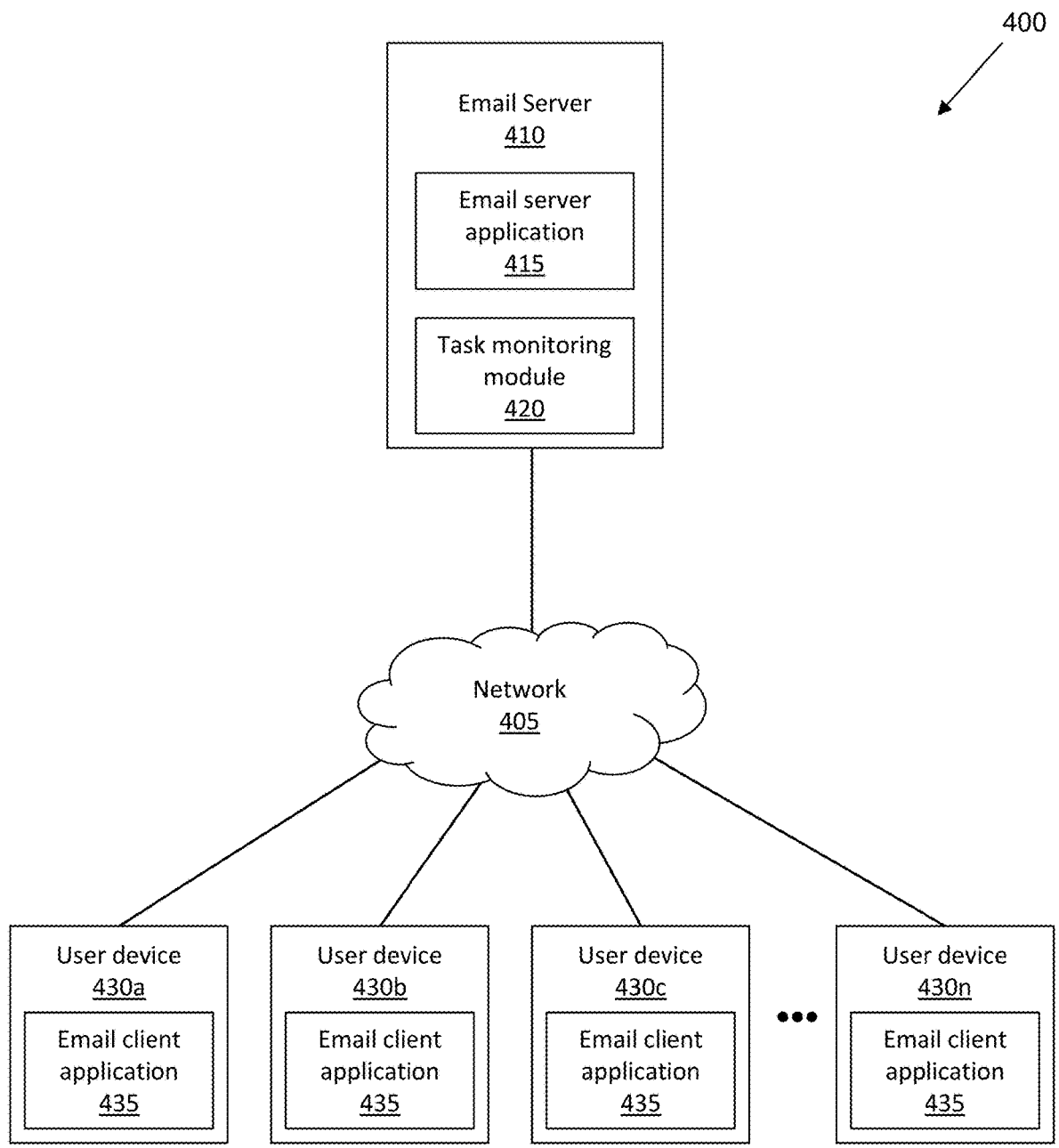
FIG. 4 shows a block diagram of an exemplary environment in accordance with aspects of the invention.

FIG. 4 shows a block diagram of an exemplary environment in accordance with aspects of the invention. In embodiments, the environment includes a network 405 providing communication between an email server 410 and plural user devices 430a, 430b, 430c, ..., 430n. The network 405 may be any one or more communication networks such as a LAN, WAN, and the Internet, and combinations thereof.

In one example, the email server 410 comprises a computing device including one or more elements of the computer system/server 12 of FIG. 1. In another example, the email server 410 comprises a virtual machine (VM). In embodiments, and in both examples, the email server 410 comprises an email server application 415 and a task monitoring module 420. The email server application 415 may be a program/utility 40 as described with respect to FIG. 1, and the task monitoring module 420 may comprise one or more program modules such as program modules 42 described with respect to FIG. 1. The email server 410 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

There may be any number "n" of user devices 430a-n. Each user device 430a-n comprises a computing device such as a smartphone, desktop computer, laptop computer, tablet computer, etc., and may comprise one or more elements of the computer system/server 12 of FIG. 1. In embodiments, each user device 430a-n comprises an email client application 435 that communicates with the email server application 415 to provide email functionality to the users of the user devices 430a-n. In one example, the email client application 435 comprises a program (e.g., program/utility 40 of FIG. 1) that is specifically related to the email server application 415, e.g., as part of a same email software product. In another example, the email client application 435 is a browser application that provides web-based email via the email server application 415. In embodiments, and in both examples, the email client application 435 and the email server application 415 communicate with each other to provide a user with email functions including but not limited to: logging in to an email account, creating an email, sending an email, receiving an email, responding to an email, and forwarding an email.

In a cloud implementation, the network 405 comprises or is part of the cloud environment 50 of FIG. 2, the email server comprises 410 one or more cloud computing nodes 10 of FIG. 2, and each of the user devices 430a-n comprises one of the local computing devices 54A-N of FIG. 2.

With continued reference to FIG. 4, in embodiments the task monitoring module 420 is configured to perform one or more functions described herein, including but not limited to: receive a sender input (via one of the user devices 430a-n) that defines an email as including an email-related task; inject code into this email that is then sent to one or more recipients (by the email server application 415), the code defining a selectable object in the email that is received by the one or more recipients; receive input from one of the recipients (via one of the user devices 430a-n) selecting the selectable object in the email; define that one of the recipients as an owner of the email-related task; monitor the email server application 415 and the email client application 435 for completion of the email-related task; close the email-related task in response to detecting the owner has completed the task; send a follow-up (via the email server application 415) to both the sender and the owner in response to determining the owner has not completed the email-related task within a predefined amount of time. In additional embodiments, the task monitoring module 420 is configured to generate a dashboard for the sender, the sender dashboard being displayed via the email client application 435 on one of the user devices 430a-n and showing emails that have been sent by the sender and a status of the email-related task associated with each of the emails contained in the sender dashboard. In additional embodiments, the task monitoring module 420 is configured to generate a dashboard for the owner, the owner dashboard being displayed via the email client application 435 on one of the user devices 430a-n and showing emails that this recipient has assumed ownership of and a status of the email-related task associated with each of the emails contained in the owner dashboard. These functions are described with respect to an exemplary use case shown in FIGS. 5-11.

Figure 5:

FIGS. 5-11 show examples of various user interfaces displayed on user devices by the email client application 435 in accordance with aspects of the invention. FIG. 5 shows an example of an email interface 500 usable for creating and sending an email in accordance with aspects of the invention. In embodiments, the interface 500 is displayed on one of the user devices 430a-n by the email client application 435 using information from the email server application 415. In embodiments, the interface 500 includes a To field 505, Cc field 510, Bcc field 515, and Subject field 520 that all function in a conventional manner. The interface 500 includes a body area 525 in which the sender of the email may enter (e.g., type, paste, etc.) a message 530 in a conventional manner. The interface 500 also includes an object 535 (e.g., a Send button) that a user may select to send the email in a conventional manner.

In accordance with aspects of the invention, and still referring to FIG. 5, the interface 500 includes a first object (e.g., an "Action Required" button) 540 that the user creating the email may select, prior to sending the email, to indicate that an email-related task is associated with this email. In accordance with aspects of the invention, and still referring to FIG. 5, the interface 500 also includes a second object (e.g., an "Enable Follow-up" button) 545 that the user creating the email may select, prior to sending the email, to initiate a follow-up procedure with this email. The objects 540 and 545 are shown with exemplary labels (e.g., Action Required and Enable Follow-up) and these labels are used herein for describing aspects of the invention; however, implementations are not limited to these labels, and other labels may be used.

Figure 6:
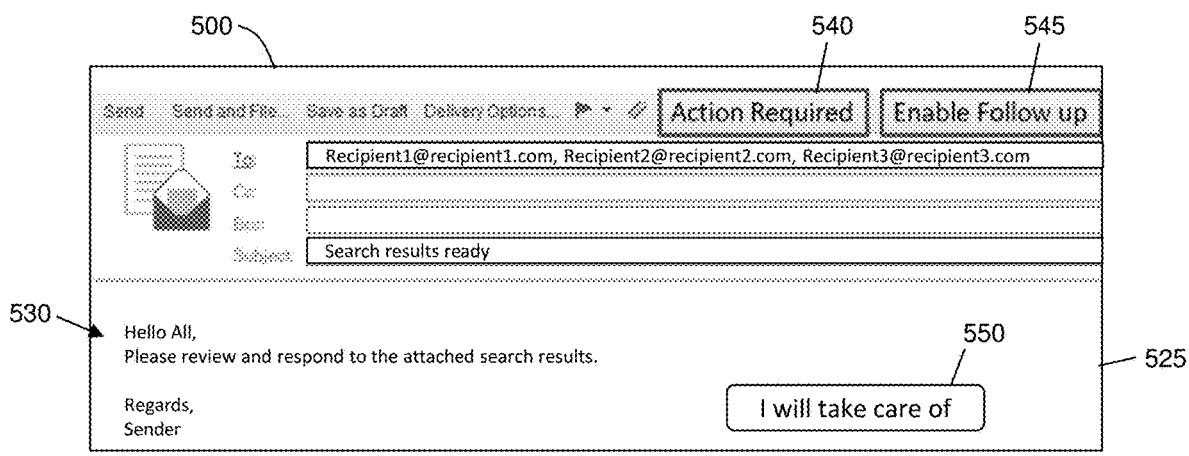

FIG. 6 continues the example from FIG. 5 and shows the interface 500 after the user has selected the Action Required object button 540. In accordance with aspects of the invention, the system inserts a selectable object (e.g., an "I will take care of" button) 550 into the email, e.g., in the body area 525, in response to the user clicking the Action Required button 540. In embodiments, the task monitoring module 420 adds the "I will take care of" button 550 as an HTML code button that is embedded in the body of the email, such that a recipient of the email will see and be able to select the "I will take care of" button 550 when the email is displayed on their user device by the email client application. As with the exemplary labels used with objects 540 and 545, the label "I will take care of" shown on object 550 is exemplary and not limiting, and other labels may be used.

Figure 7:
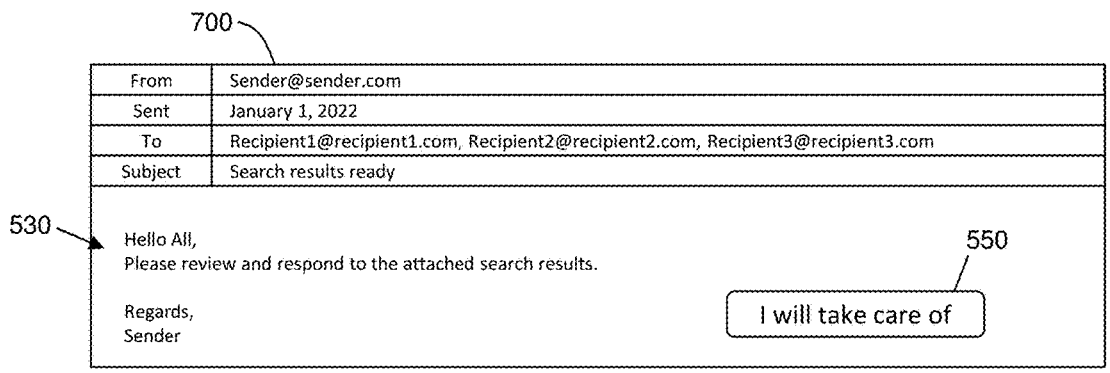

FIG. 7 continues the example from FIGS. 5 and 6 and shows an interface 700 illustrating a received email that corresponds to the email that was created and sent in the example of FIGS. 5 and 6, after the email is sent by the sender and received by the recipients. As shown in the interface 700, the received email includes the message 530 and "I will take care of" button 550 in the body of the email. In accordance with aspects of the invention, the first one of the recipients that selects (e.g., clicks) the "I will take care of" button 550 becomes the owner of the task associated with this email. In embodiments, the email client applications 435 monitor the user inputs at the interface 700 of all the recipients of this email and detects when one of the recipients selects (e.g., clicks) the "I will take care of" button 550. In response to this monitoring and detecting, the email client application 435 transmits data to the task monitoring module 420 indicating that a particular user has selected the "I will take care of" button 550. In embodiments, the first user to select the "I will take care of" button 550 is deemed the owner of the task for this email. In embodiments, the task monitoring module 420 determines the first user to select the "I will take care of" button 550 for a particular email based on the order that the indications are received from the email client applications 435.

FIG. 8 continues the example from FIGS. 5-7 and shows an interface 800 illustrating an email that the system sends after one of the recipients selects the "I will take care of" button 550 in accordance with aspects of the invention. In embodiments, in response to receiving the indication (from one of the email client applications 435) that one of the users selected the "I will take care of" button 550, the task monitoring module 420 causes the email server application 415 to automatically send an email notifying all recipients of the task owner. In the example shown in FIG. 8, the user with the email address "Recipient1@recipient1.com" is the user that first clicked on the "I will take care of" button 550 amongst all the recipients of the email. As a result, in this example the email server application 415 automatically sends the email shown in FIG. 8 to the other recipients (e.g., "Recipient2@recipient2.com" and "Recipient3@recipient3.com") and the sender of the original email (e.g., "Sender@sender.com"). In embodiments, the automated email includes a message 805 that identifies the owner of the task, i.e., the recipient that first selected the "I will take care of" button 550 ("Recipient1@recipient1.com" in this example). In the example shown in FIG. 8, the email also includes the message 530 from the previous emails to provide context for the message 805.

FIG. 9 continues the example from FIGS. 5-8 and shows an interface 900 illustrating an email the system sends in response to determining that the owner of the task associated with this email has not completed the task within a predefined amount of time. In embodiments, in response to receiving the indication (from one of the email client applications 435) that one of the users selected the "I will take care of" button 550, the task monitoring module 420 determines whether the task associated with this particular email has been completed within a predefined amount of time. In one example, the task for this email is deemed complete when the owner replies to the sender. In this example, the task monitoring module 420 monitors email traffic in the email system (via the email server application 415) and detects when the owner ("Recipient1@recipient1.com" in this example) sends a reply email to the sender ("Sender@sender.com" in this example), the reply email being a reply from any of the emails in this conversation (e.g., the email shown in FIG. 7 or the email shown in FIG. 8). In another example, the task for this email is deemed complete when the owner or sender provides input to their respective dashboard indicating the task is complete. In this example, the task monitoring module 420 monitors information from the email client applications 435 for user input to the respective user dashboards (described at FIGS. 10 and 11), the user input indicating that the task for this email is complete. In embodiments, including both examples, the task monitoring module 420 determines whether the task is completed within a predefined amount of time. In the event the task monitoring module 420 determines the task is not completed within the predefined amount of time, then the task monitoring module 420 causes the email server application 415 to send a follow-up (e.g., reminder) email to at least the owner. In the example shown in FIG. 9, the email server application 415 sends the follow-up email to both the owner ("Recipient1@recipient1.com" in this example) and the sender ("Sender@sender.com" in this example). In embodiments, the follow-up email includes a message 905 that provides a reminder to the owner to complete the task. In the example shown in FIG. 9, the follow-up email also includes the messages 530, 805 from the previous emails to provide context for the message 905.

In embodiments, the predefined amount of time is a configurable value that the sender can set via their email client application 435. Examples of the configurable predefined amount of time include a number of hours or a number of days indicated by the sender. In one example, the predefined amount of time is measured starting from the time that the initial email was sent (e.g., the email of FIG.

6). In another example, the predefined amount of time is measured starting from the time that one of the recipients selects the "I will take care of" button 550 (e.g., the email of FIG. 6) and thereby becomes the owner.

In embodiments, the system determines whether the task associated with this particular email has been completed within a predefined amount of time only in response to the sender selecting the "Enable Follow up" 545 button when creating the email, e.g., as in FIGS. 5 and 6. In these embodiments, the system does not determine whether the task associated with this particular email has been completed within a predefined amount of time when the sender did not select the "Enable Follow up" 545 button. In this manner, the sender may selectively control applying the follow up feature for each email sent, as there might be situations when the follow up feature is not wanted.

Figure 10:
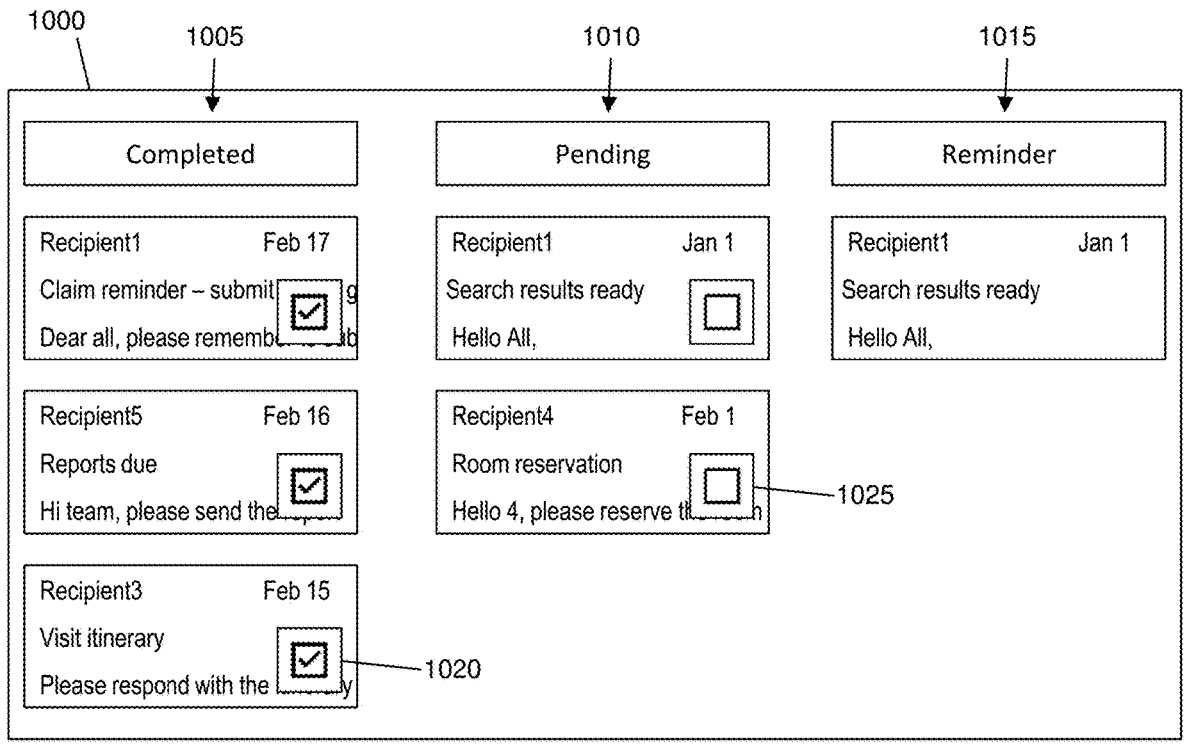

FIG. 10 shows an interface 1000 including a sender dashboard in accordance with aspects of the invention. The interface 1000 may be shown on one of the user devices 430*a-n* by the email client application 435 using information received from the task monitoring module 420 for a particular user. In embodiments, the sender dashboard is a user interface that shows the status of emails that this user has sent with the task monitoring feature by selecting the "Action Required" 540 button when creating and sending. In this example, the dashboard includes a first area 1005 that shows emails for which the task has been completed, a second area 1010 that shows emails for which the task has not yet been completed, and a third area 1015 that shows emails for which a reminder has been sent (e.g., for emails for which the user has also selected the "Enable Follow up" button 545 and for which the predefined time has passed). In embodiments, the emails in the first area 1005 are marked with an icon 1020 that indicates the task for this email is complete. In embodiments, the emails in the second area 1010 include a selectable object 1025 that the sender may select (e.g., via mouse click or other input) to provide input indicating that the task for this email is complete. For example, the sender may become aware, via one or more channels outside of the email conversation associated with this particular email, that the owner has taken action that completes the task. In this situation, the sender may use the object 1025 to manually mark this task as complete. In embodiments, marking the task as complete moves the particular email from the second area 1010 to the first area 1005. The sender dashboard thus provides a user with a visual interface to quickly see the status of emails this user has sent with a task, who has accepted ownership of the task for each such email, and the status of the task for each such email.

Figure 11:
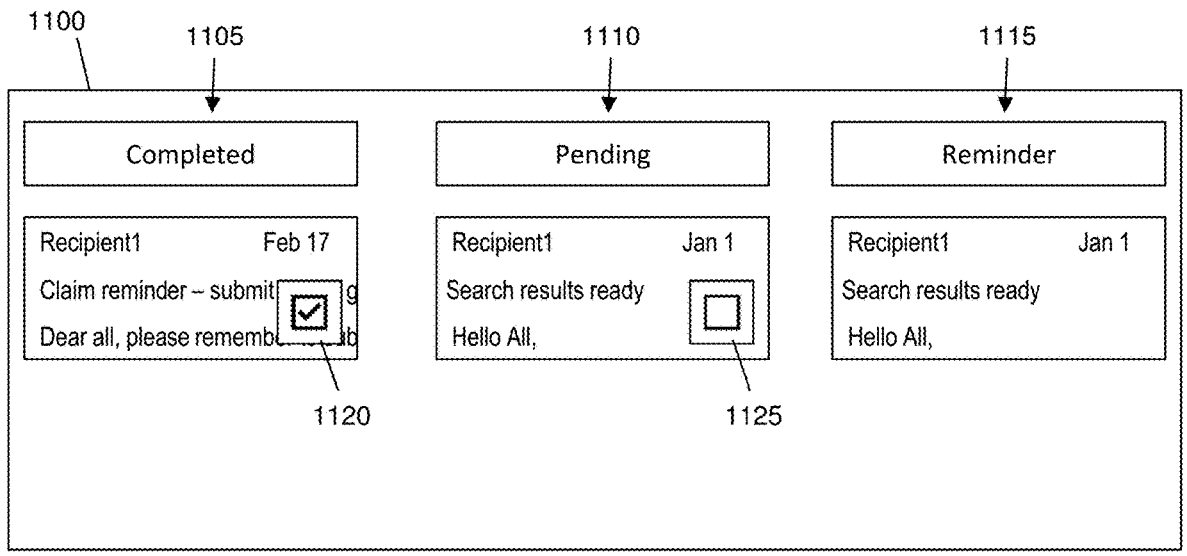

FIG. 11 shows an interface 1100 including an owner dashboard in accordance with aspects of the invention. The interface 1100 may be shown on one of the user devices 430*a-n* by the email client application 435 using information received from the task monitoring module 420 for a particular user. In embodiments, the owner dashboard is a user interface that shows the status of emails that this user has received and taken ownership of, e.g., by selecting the "I will take care of" button 550 in the received email. In this example, the dashboard includes a first area 1105 that shows emails for which the task has been completed, a second area 1110 that shows emails for which the task has not yet been completed, and a third area 1115 that shows emails for which a reminder has been sent (e.g., for emails for which the sender selected the "Enable Follow up" button 545 and for which the predefined time has passed). In embodiments, the emails in the first area 1105 are marked with an icon 1120 that indicates the task for this email is complete. In embodiments, the emails in the second area 1110 include a selectable object 1125 that the user may select (e.g., via mouse click) to provide input indicating that the task for this email is complete. For example, this user may have completed the task for a particular email in a manner that does not involve sending a reply email to the sender of the email. In this situation, the user may use the object 1125 to manually mark this task as complete. In embodiments, marking the task as complete moves the particular email from the second area 1110 to the first area 1105. The owner dashboard thus provides a user with a visual interface to quickly see the status of emails for which this user has assumed ownership of a task, and the status of the task for each such email.

Figure 12:
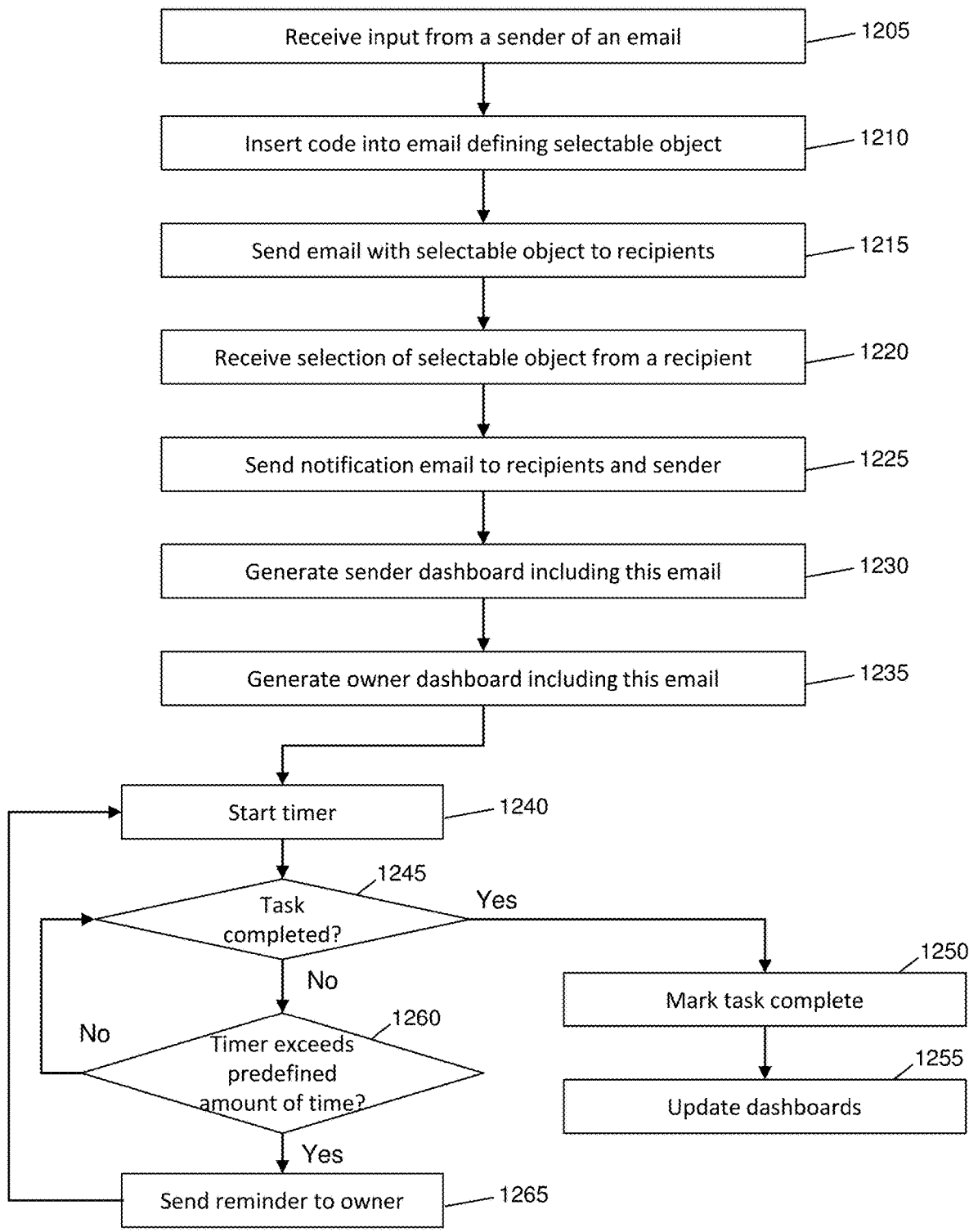
FIG. 12 shows a flowchart of an exemplary method in accordance with aspects of the invention.

FIG. 12 shows a flowchart of an exemplary method in accordance with aspects of the present invention. Steps of the method may be carried out in the environment of FIG. 4 and are described with reference to elements depicted in FIGS. 4-11.

At step 1205, the system receives input from a sender of an email. In embodiments, and as described with respect to FIGS. 4-11, the sender uses their email client application 435 to create an email and provide input that indicates a task is associated with the email. In embodiments, the input comprises the sender selecting an "Action Required" button 540. In embodiments, the task monitoring module 420 receives data from the email client application 435 that defines the email and that indicates the user selected the "Action Required" button. Step 1205 may also include the sender selecting the "Enable Follow up" button 545, and the task monitoring module 420 receiving data from the email client application 435 indicating this selection.

At step 1210, the system inserts code into the email (from step 1205), the code defining a selectable object in the email. In embodiments, and as described with respect to FIGS. 4-11, the task monitoring module 420 inserts code into the email, the code defining an "I will take care of" button 550.

At step 1215, the system sends the email (from step 1210) to recipients. In embodiments, and as described with respect to FIGS. 4-11, the sender provides input via their email client application 435 to send the email. The email server application 415 receives the input from the email client application 435 and sends the email to the recipients included in the email. Step 1215 my include the recipient user devices 430*a-n* receiving the email and displaying the email, with the "I will take care of" button 550 via email client applications 435.

At step 1220, the system receives input indicating a selection of the selectable object from one of the recipients. In embodiments, and as described with respect to FIGS. 4-11, one of the recipients selects the "I will take care of" button 550 in the email that is displayed in their email client application 435, the task monitoring module 420 receives an indication of this input, and the task monitoring module 420 assigns this recipient as the owner of the task associated with this email.

At step 1225, the system sends a notification to the recipients and sender, the notification indicating the owner of the task. In embodiments, and as described with respect to FIGS. 4-11, the task monitoring module 420 causes the email server application 415 to send an email to the recipients and owner, e.g., as shown in FIG. 8.

At step 1230, the system generates a sender dashboard including the email of step 1220 and the owner as indicated at step 1225. In embodiments, and as described with respect to FIGS. 4-11, the task monitoring module 420 generates the sender dashboard, e.g., as shown in FIG. 10. The generating may include adding the email to an already existing sender dashboard. The generating may include generating a new sender dashboard including the email. The sender dashboard may be included in a user interface of the email client application 435, such that a user who is logged into the email client application 435 may view their personalized sender dashboard showing emails that they have sent and recipients who have assumed ownership of the tasks in those emails.

At step 1235, the system generates an owner dashboard including the email of step 1220 and the owner as indicated at step 1225. In embodiments, and as described with respect to FIGS. 4-11, the task monitoring module 420 generates the owner dashboard, e.g., as shown in FIG. 11. The generating may include adding the email to an already existing owner dashboard. The generating may include generating a new owner dashboard including the email. The owner dashboard may be included in a user interface of the email client application 435, such that a user who is logged into the email client application 435 may view their personalized owner dashboard showing emails associated with tasks for which the user has assumed ownership.

At step 1240, the system starts a timer. In embodiments, and as described with respect to FIGS. 4-11, the task monitoring module 420 determines whether the task associated with this particular email has been completed within a predefined amount of time. In embodiments, the task monitoring module starts a timer at step 1240 to measure when the predefined amount of time has elapsed. In one example, the task monitoring module 420 starts the timer when the initial email is sent, e.g., at step 1215, such that the predefined amount of time is measured starting from the time that the initial email was sent. In another example, the task monitoring module 420 starts the timer when one of the recipients selects the "I will take care of" button 550, e.g., at step 1220, such that the predefined amount of time is measured starting from the time when one of the recipients becomes the owner. In another example, the task monitoring module 420 starts the timer when the notification is sent at step 1225, such that the predefined amount of time is measured starting from the time when the sender and recipients are notified of which recipient assumed ownership of this email.

At step 1245, the system determines whether the task associated with this email has been completed. In embodiments, and as described with respect to FIGS. 4-11, the task monitoring module 420 determines whether the task associated with this particular email has been completed based on one of: detecting the owner sends a reply email to the sender for this email; detecting the sender provides manual input (e.g., via the sender dashboard) that the task is complete; and detecting the owner provides manual input (e.g., via the owner dashboard) that the task is complete. The detecting in each of these three alternatives may be performed by the task monitoring module 420 monitoring the email server application 415 and/or the email client applications 435.

In response to the system determining at step 1245 that the task is completed, then at step 1250 the system marks the task as complete. In embodiments, the task monitoring module 420 updates a running list of open tasks in the email system to mark this particular task as complete. At step 1255, the system updates the dashboards. In embodiments, the task monitoring module 420 updates the sender dashboard and the owner dashboard to mark this task as complete, e.g., as described with respect to FIGS. 10 and 11.

In response to the system determining at step 1245 that the task is not completed, then at step 1260 the system determines whether the timer (from step 1240) exceeds the predefined amount of time. In embodiments, the task monitoring module 420 compares the value of the timer to the predefined amount of time.

In response to the system determining at step 1260 that the timer does not exceed the predefined amount of time, then the process returns to step 1245 with the timer still running. In this manner, the system continues to check whether the task is completed until one of two things occurs: either the system determines the task is completed or the system determines the timer exceeds the predefined amount of time.

In response to the system determining at step 1265 that the timer does exceed the predefined amount of time, then at step 1265 the system sends a reminder to the owner of the task of this email. In embodiments, and as described with respect to FIGS. 4-11, the task monitoring module 420 causes the email server application 415 to send a reminder email, e.g., as shown in FIG. 9. The reminder email can be sent to the owner only, or to the owner and sender, or to the owner, the sender, and all other recipients. In embodiments, after sending the reminder email, the process returns to step 1240 where the system restarts the timer and enters the loop again.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method, comprising:
receiving, by a computing device operating an email server, input from a sender of an email, the input defining the email as having an email related task associated with it, responsive to the sender of the email identifying the email as having an action required, the action required associated with the email related task of the email;

inserting, by the email server of the computing device, code into the email, the code defining a selectable object in the email, the selectable object associated with the email related task, wherein the selectable object corresponds to one of task ownership and task status;

sending, by the email server of the computing device, the email to one or more recipients;

receiving, by the email server of the computing device, input indicating a selection of the selectable object by one of the one or more recipients;

assigning, by the email server of the computing device, the one of the one or more recipients as an owner of the email related task, responsive to one of the one or more recipients selecting the task ownership selectable object in the email; and sending, by the email server of the computing device, a notification email to the sender and the one or more recipients, the notification email indicating the owner of the email related task.

2. The method of claim 1, wherein the input from the sender comprises selection of a first object prior to sending the email.

3. The method of claim 2, responsive to the sender selecting a second object that activates a follow-up feature for the email related task, monitoring, by the email server of the computing device, subsequent emails related to the email related task for an indication of completion of the email related task; and automatically requesting, by the email server of the computing device, a follow-up to the owner of the email related task, when a threshold of time is exceeded after the owner of the email related task has selected ownership of the email related task.

4. The method of claim 1, further comprising generating a sender dashboard that includes the email, the sender dashboard being an interface that shows emails with email related tasks sent by the sender.

5. The method of claim 4, wherein the sender dashboard includes an object that is selectable by the sender to indicate the email related task is completed.

6. The method of claim 1, further comprising generating an owner dashboard that includes the email, the owner dashboard being an interface that shows emails including email related tasks for which the owner has accepted ownership.

7. The method of claim 6, wherein the owner dashboard includes an object that is selectable by the owner to indicate the email related task is completed.

8. The method of claim 1, further comprising monitoring, by the email server of the computing device, emails corresponding to the email related task to determine whether the owner has completed the email related task within a predefined amount of time.

9. The method of claim 8, in response to determining the owner has completed the email related task within the predefined amount of time, automatically marking the email related task as complete, by the email server of the computing device.

10. The method of claim 8, in response to determining the owner has not completed the email related task within the predefined amount of time, automatically sending a reminder email to the owner.

11. A computer program product comprising one or more computer readable storage media having program instructions collectively stored on the one or more computer readable storage media, the program instructions executable to:

receive input from a sender of an email, the input defining the email as having an email related task associated with it, responsive to the sender of the email identifying the email as having an action required, the action required associated with the email related task of the email;

insert code into the email, the code defining a selectable object in the email, the selectable object associated with the email related task, wherein the selectable object corresponds to one of task ownership and task status;

send the email to one or more recipients;

receive input indicating a selection of the selectable object by one of the one or more recipients;

assign the one of the one or more recipients as an owner of the email related task, responsive to one of the one or more recipients selecting the task ownership selectable object in the email; and send a notification email to the sender and the one or more recipients, the notification email indicating the owner of the email related task.

12. The computer program product of claim 11, wherein the program instructions are executable to:

generate a sender dashboard that includes the email, the sender dashboard being an interface that shows emails with email related tasks sent by the sender; and generate an owner dashboard that includes the email, the owner dashboard being an interface that shows emails including email related tasks for which the owner has accepted ownership.

13. The computer program product of claim 12, wherein the program instructions are executable to monitor emails corresponding to the email related task to determine whether the owner has completed the email related task within a predefined amount of time.

14. The computer program product of claim 13, wherein the program instructions are executable to:

in response to determining the owner has completed the email related task within the predefined amount of time, automatically mark the email related task as complete; and in response to determining the owner has not completed the email related task within the predefined amount of time, automatically send a reminder email to the owner.

15. The computer program product of claim 13, wherein the determining whether the owner has completed the email related task within a predefined amount of time comprises one of:

detecting the owner sends a reply email to the sender;

detecting the sender provides input to the sender dashboard indicating the email related task is complete; and detecting the owner provides input to the owner dashboard indicating the email related task is complete.

16. A system comprising:

a processor, a computer readable memory, one or more computer readable storage media, and program instructions collectively stored on the one or more computer readable storage media, the program instructions executable to:

receive input from a sender of an email, the input defining the email as having an email related task associated with it, responsive to the sender of the email identifying the email as having an action required, the action required associated with the email related task of the email;

insert code into the email, the code defining a selectable object in the email, the selectable object associated with the email related task, wherein the selectable object corresponds to one of task ownership and task status;

send the email to one or more recipients;

receive input indicating a selection of the selectable object by one of the one or more recipients;

assign the one of the one or more recipients as an owner of the email related task responsive to one of the one or more recipients selecting the task ownership selectable object in the email; and send a notification email to the sender and the one or more recipients, the notification email indicating the owner of the email related task.

17. The system of claim 16, wherein the program instructions are executable to:

generate a sender dashboard that includes the email, the sender dashboard being an interface that shows emails with email related tasks sent by the sender; and generate an owner dashboard that includes the email, the owner dashboard being an interface that shows emails including email related tasks for which the owner has accepted ownership.

18. The system of claim 17, wherein the program instructions are executable to monitor emails corresponding to the email related task to determine whether the owner has completed the email related task within a predefined amount of time.

19. The system of claim 18, wherein the program instructions are executable to:

in response to determining the owner has completed the email related task within the predefined amount of time, automatically mark the email related task as complete; and in response to determining the owner has not completed the email related task within the predefined amount of time, automatically send a reminder email to the owner.

20. The system of claim 18, wherein the determining whether the owner has completed the email related task within a predefined amount of time comprises one of:

detecting the owner sends a reply email to the sender;

detecting the sender provides input to the sender dashboard indicating the email related task is complete; and detecting the owner provides input to the owner dashboard indicating the email related task is complete.

* * * * *